United States Patent [19]
Meisenheimer, Jr.

[11] 3,863,871
[45] Feb. 4, 1975

[54] VIBRATION ISOLATION MOUNTING ASSEMBLY

[76] Inventor: Daniel T. Meisenheimer, Jr., 404 Longmeadow Rd., Orange, Conn.

[22] Filed: May 14, 1973

[21] Appl. No.: 359,794

[52] U.S. Cl..................... 248/15, 267/153, 403/226
[51] Int. Cl................................................ F16s 1/36
[58] Field of Search ......... 248/15, 9, 10, 24, 358 R, 248/22; 267/153; 296/35 R; 403/226, 229, 228

[56] References Cited
UNITED STATES PATENTS

| | | | |
|---|---|---|---|
| 1,605,126 | 11/1926 | Maynard | 248/9 |
| 1,744,009 | 1/1930 | Parker | 248/9 |
| 2,689,122 | 9/1954 | Musikant | 248/22 X |
| 3,035,799 | 5/1962 | Peirce | 248/15 |
| 3,180,594 | 4/1965 | Connell | 248/9 |
| 3,203,654 | 8/1965 | Sweeney et al. | 248/358 R X |
| 3,447,814 | 6/1969 | Erwin-Walter Siber et al. | 267/153 X |
| 3,490,556 | 1/1970 | Bennett et al. | 248/358 R X |
| 3,584,858 | 6/1971 | Beck | 267/153 |

Primary Examiner—J. Franklin Foss
Attorney, Agent, or Firm—Wooster, Davis & Cifelli

[57] ABSTRACT

A mounting bracket for protecting a control mounted therein from vibration and amplified vibratory loads comprises a mounting bracket body loosely surrounding a control housing. The interior surface of the mounting bracket body is provided with two shoulders which separate a small diameter center portion from two larger diameter end portions. Resilient bushings nest in the larger diameter portions abutting against the shoulders and protruding beyond the end of the mounting bracket body. The control mounted in the mounting bracket preferably includes a control housing having its outside surface supported in the resilient bushings and further comprising radially outwardly protruding surfaces which engage the ends of the resilient bushings, whereby the control is supported in both radial and axial modes. An integral mounting flange extends outward from the mounting bracket control body for securing the mounting bracket to a structural member.

6 Claims, 3 Drawing Figures

PATENTED FEB 4 1975  3,863,871
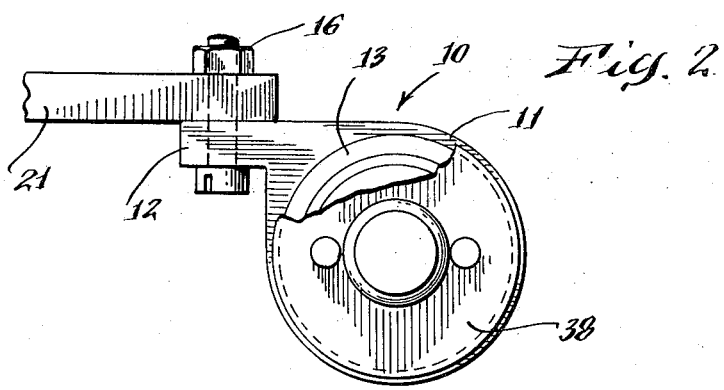
Fig. 2.
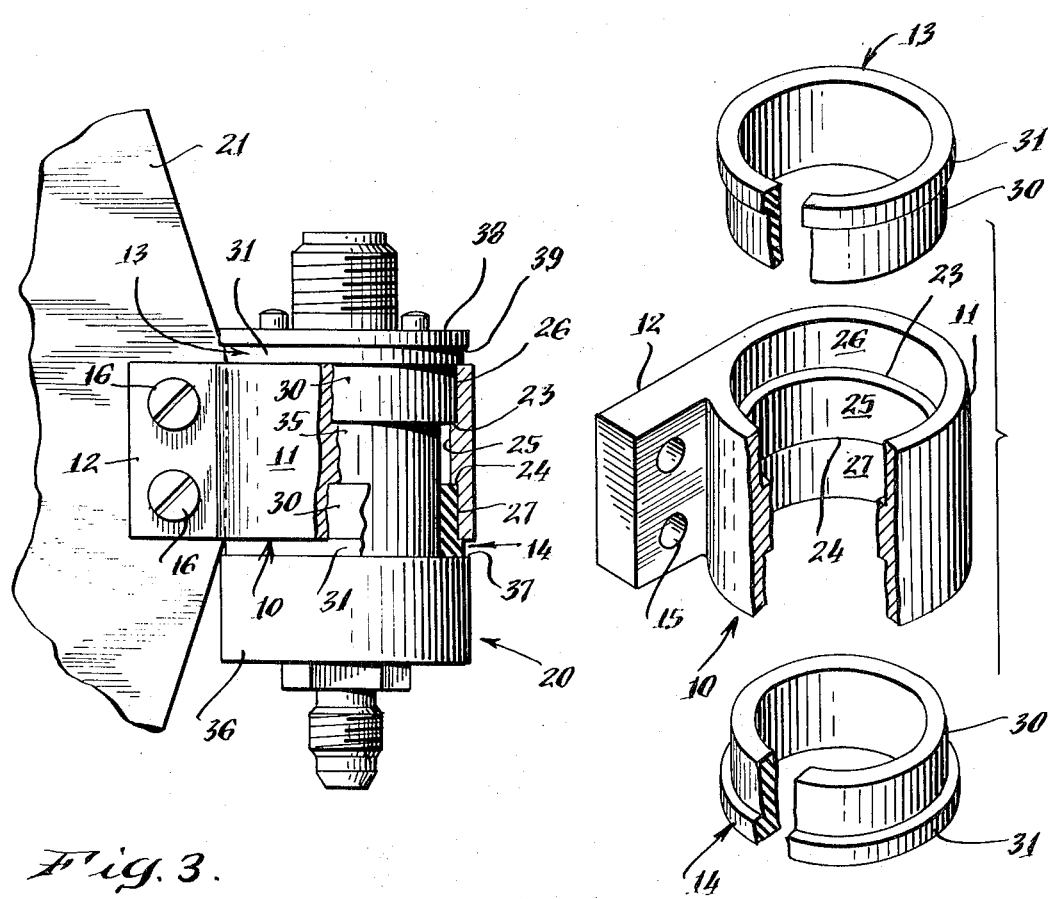
Fig. 1.
Fig. 3.

VIBRATION ISOLATION MOUNTING ASSEMBLY

BACKGROUND OF THE INVENTION

This invention relates to apparatus for mounting and vibrationally isolating controls in a vibrational environment, and more particularly it relates to mounting apparatus including vibration damping material arranged to absorb and damp vibrations in either an axial or radial mode.

Helicopters, aircraft, and other sophisticated vehicles often include substantial numbers of relatively sensitive control devices. Examples of such control devices include temperature and pressure operated switches, valves, and the like. Such devices may be adversely affected by the vibrations and shock loads which often occur in the operation of such vehicles. The adverse effects can range from causing the controls to operate as a result of vibration or shock instead of as a result of the desired input, causing decalibration of the controls, causing the controls to become disassembled, or causing actual structural failure of the controls or their connections.

Prior art devices for attaching controls to a helicopter include a clamp for surrounding the control housing, and vibration isolation was provided by a sheet or rubber wrapped around the control and compressed between the control and the clamp. The rubber was necessarily in compression in order for the clamp to hold the control in a stationary position. However, the compressed rubber did not provide adequate cushioning against vibration and shock in many instances. A particular problem with such vibration dampening provision was that although rubber of a proper resiliency for dampening vibrations in a certain frequency range could be chosen, the dampening characteristics of the rubber were altered by the clamping. Thus, design choice for dampening against certain frequency vibrations was very difficult with that type of clamp. Further, the amount of rubber which could be interposed between the clamp and the control housing was limited.

GENERAL DESCRIPTION OF THE INVENTION

The invention herein generally comprises a bracket for surrounding the control to be mounted therewith. The interior of the bracket is provided with enlarged diameter portions adjacent to either end, the enlarged portions being separated from a smaller diameter central portion by a shoulder. Resilient bushings comprising a body portion mating with the larger diameter interior surface of the mounting bracket and an enlarged cap are placed in the mounting bracket with the cap portion extending outwardly therefrom. The interior diameter of the rubber bushings is smaller than the interior diameter of the central portion of the bracket, and the interior diameter of the rubber bushings is selected to matingly receive the body portion of the control. The control is held in the mounting bracket by means of peripherally enlarged caps or other outwardly protruding flanges which engage the ends of the rubber bushings.

Thus, the control is held in the mounting assembly and isolated therefrom by rubber bushings which are not compressed. The control is isolated from vibration in a axial mode by the portion of the rubber bushings between the cap of the control and the shoulder of the mounting bracket. The control is isolated from vibration in a radial direction by the thickness of the rubber bushings.

Because the rubber bushing is not in compression, its durometer characteristics are not affected, and a durometer for dampening vibrations in a specified frequency range may be selected.

OBJECTS OF THE INVENTION

It is an object of this invention to provide an improved bracket and associated resilient bushings for mounting controls.

It is another object of the invention to provide an improved bracket and associated resilient bushings for mounting controls and for isolating the mounted controls from vibrations.

It is an additional object of the invention to provide a mounting bracket of the above character in which the resilient bushings are not in compression when the control is mounted therein.

It is a further object of the invention to provide a mounting bracket and associated resilient bushings which provide vibration dampening in both axial and radial modes.

These and other objects and advantages of the invention will be in part obvious and will in part appear from a perusal of the following description of the preferred embodiment and appended claims, taken together with the drawings.

THE DRAWINGS

FIG. 1 is an exploded perspective view, partially cutaway, of a mounting bracket and associated resilient bushings according to the invention herein;

FIG. 2 is an end elevation view of the mounting bracket of FIG. 1 having a control mounted therein; and, FIG. 3 is a side elevation view, partially cut away, of the mounting bracket and control of FIG. 2.

The same reference numbers refer to the same elements throughout the various Figures.

DESCRIPTION OF PREFERRED EMBODIMENT

Referring now to FIG. 1, a mounting bracket 10 according to the invention herein is shown. It generally comprises a metal body 11 having a flange 12 extending outwardly therefrom, and two resilient bushings 13 and 14. The mounting bracket 10 is adapted for securing a control 20 to a structural member 21 of an aircraft, helicopter or the like, as shown in FIGS. 2 and 3.

The body 11 of the mounting bracket 10 is generally tubular or cylindrical and may be formed integrally with the flange 12. The flange 12 extends outwardly from the body 11 such that one surface of flange 12 is tangent to the outside thereof, as best seen in FIG. 2. The flange 12 is provided with two or more holes 15 for securing the mounting bracket 10 to, for instance, an airframe member 21 by means of nuts and bolts 16.

The interior surface of body portion 11 is provided with two shoulders 23 and 24 which separate a smaller diameter center portion 25 from two larger diameter portions 26 and 27 each adjacent to the ends of body portion 11.

The resilient bushing 14 comprises a generally tubular portion 30 and a cap 31 extending radially outward therefrom at one end. The outside diameter of tubular portion 30 is equal to inside diameter of surface 27 of housing 11, and the inside diameter of the bushings 14 is smaller than the inside diameter of surface 25 of housing 11, the inside diameter of the bushings also being equal to the outside diameter of the control 20. Resilient bushing 13 is the same.

The resilient bushings 13 and 14 nest in the ends of body 11 of the mounting bracket 10, as best seen in FIG. 3. The inner ends of the resilient bushings partially abut against shoulders 23 and 24 and the undersides of the caps of the resilient bushings engage the ends of body 11 of the mounting bracket 10.

The above described mounting bracket 10 is adapted for receiving a control 20 having a tubular body portion 35 having an outside diameter equal to the inside diameter of the rubber bushings 13 and 14. The control 20 further comprises an enlarged base portion 36 defining a shoulder 37 between the base portion and the tubular portion, the shoulder 37 engaging the end surface of the rubber bushing 14. A cap 38 is secured to the top of the tubular body portion 35, and the cap 38 extends radially outwardly from the tubular body portion wherein the peripheral portion 39 of its bottom surface engages the end of the bushing 13. The control 20 is mounted into the bracket by sliding the tubular body portion 35 upwardly between the bushings 13 and 14, and thereafter securing the cap 38.

Referring now to FIG. 3, the outside diameter of the tubular body 35 of the control 20 is smaller than the inside diameter of surface 25 of the body 11 of mounting bracket 10, and thus, the body 11 does not touch the control. A substantial amount of resilient material is positioned between shoulder 23 and cap 38 and between shoulder 24 and shoulder 37. A substantial amount of resilient material is also positioned between surfaces 26 and 27 and the tubular body 35 of control 20. Therefore, the control is suspended in the mounting bracket 10 by means of the resilient bushings, and a substantial amount of resilient material is positioned for absorbing shocks and vibrations and having components in the axial direction, and similarly a substantial amount of resilient material exists for absorbing shocks and vibrations having components in a radial direction.

The resilient bushings 13 and 14 are not compressed in order to secure the control 20 in mounting bracket 10, as it was the case in prior art mounting clamps. Thus, flexible and resilient materials can be used to fabricate the bushings, and the vibration dampening characteristics of the material are not altered by compressing it for mounting the control.

In practice, the characteristics of the resilient material are chosen to damp out vibrations which are known to exist in the environment in which the control is to be mounted, and which are also known to be likely to affect the operation of the control. The chosen characteristics of the resilient material also depend upon the mass of the control being mounted, and the resilient material may be any thing from silicone sponge to high durometer rubber.

When secured to a helicopter structural member, the mounting bracket 10 is subjected to amplified vibratory loads on the order of 10 G's and higher. It is desired to protect the control 20 carried by the bracket from these amplified vibratory loads at selected frequencies.

The control isolated by the resilient bushings exhibits a crossover frequency at the square root of two times the resonant frequency of the control mounted in the resilient bushings: $f_c = \sqrt{2} f_r$. Above the crossover frequency, the resilient bushings act to attenuate the amplified vibratory loads transmitted from the body 11 of the bracket to the control 20 mounted therein. The amplified vibratory loads decrease approximately logarithmically at frequencies above the crossover frequency.

As a specific example, it was desired to protect control 20 weighing approximately 4.75 ounces from amplified vibratory loads at frequencies of 150 cps and up. Bushings of 40 durometer rubber were selected which provided a resonant frequency of the control at approximately 105 cps. Using the shape of the resilient bushings shown in the drawings, the resonant frequencies are approximately equal in both the radial and axial modes of vibration.

The 105 cps resonant frequency results in a crossover frequency of 150 cps, and the control is thereby effectively vibrationally isolated from amplified vibratory loads at frequencies above 150 cps, the protection against the amplified vibratory loads increasing with the frequency.

The durometer of the resilient bushings may be different to protect different masses from amplified vibratory loads at various frequencies. It is also possible to provide a bushing 13 of a first durometer and a bushing 14 of a second different durometer in the same mounting assembly for specific protection needs.

Controls of other configurations, such as controls having a square body portion, can be accommodated in brackets according to the invention herein. For a square control, the body portion of the mounting bracket would have a rectangular cross section and would loosely surround the control body. The interior of the body portion would be provided with shoulders adjacent the open ends thereof, and the bushings would be fabricated to mate with the interior shape of the housing and to engage the shoulders so as to be positioned between the control and the bracket in a manner similar to that shown in FIG. 3. Other shapes of controls, such as controls having hexagonal bodies or any other regular or irregular polygonal bodies can be mounted in mounting brackets according to the invention by selecting or fabricating the body portion thereof appropriately.

Although mounting bracket 10 is shown constructed with a solid cylindrical body, the body and flange could also be split wherein the body could be temporarily expanded to admit the control.

Thus, an improved mounting bracket for protecting sensitive controls from vibration and amplified vibratory loads has been provided. It is believed that the many advantages thereof will now be apparent to those skilled in the art. It will also be apparent that a number of variations and modifications may be made without departing from the spirit and scope of the invention. Accordingly, the foregoing description is to be considered as illustrative only, rather than limiting.

What I claim is:

1. A mounting bracket for supporting a control having a body flanked by radially outwardly protruding surfaces and for isolating the control from vibration and amplified vibratory loads, the mounting bracket comprising a body portion loosely surrounding the control body, the interior of the body portion of the mounting bracket having inwardly disposed shoulders spaced from either end thereof, and two resilient bushings, each resilient bushing mating with the interior of the body portion of the mounting bracket between the shoulder and the open end thereof, the inner end of the resilient bushing abutting against the inwardly disposed shoulder and the outer end of the resilient bushing extending outwardly beyond the open end of the body portion of the mounting bracket, the body portions of the mounting bracket and the resilient bushings being of a size such that the resilient bushings are not compressed when the control is mounted therein, wherein the control is supported in the body portion of the mounting bracket by the resilient bushings, radial support of the control being provided by the portions of the resilient bushings between the interior of the body portion of the mounting bracket and the exterior of the control housing and axial support of the control being provided by the portions of the resilient bushings between the shoulders of the body portion of the mounting bracket and the radially outward protruding surfaces flanking the body of the control.

2. A mounting bracket as defined in claim 1 and further comprising an integral mounting flange protruding outwardly from the exterior of the mounting bracket body.

3. A mounting bracket as defined in claim 1 wherein the mounting bracket body is cylindrical.

4. A mounting bracket as defined in claim 1 wherein each of the resilient bushings has an outwardly protruding cap portion which is positioned adjacent to the end of the mounting bracket body portion when the resilient bushing is mated therein.

5. A mounting bracket as defined in claim 1 wherein the mounting bracket body has continuous closed peripheral surfaces.

6. A mounting bracket as defined in claim 1 wherein the resilient bushings are fabricated of rubber having a durometer such that the resonant and crossover frequencies of the control supported in the mounting bracket are below the frequencies at which the control is to be protected from vibration and amplified vibratory loads.

* * * * *